United States Patent
Gilson

(10) Patent No.: US 8,978,076 B2
(45) Date of Patent: Mar. 10, 2015

(54) METHODS AND SYSTEMS FOR CONTENT CONTROL

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/669,045

(22) Filed: Nov. 5, 2012

(65) Prior Publication Data

US 2014/0130110 A1 May 8, 2014

(51) Int. Cl.
| | | |
|---|---|---|
| *H04N 7/173* | (2011.01) | |
| *H04N 7/18* | (2006.01) | |
| *H04N 21/43* | (2011.01) | |
| *H04N 21/234* | (2011.01) | |
| *H04N 21/2343* | (2011.01) | |
| *H04N 21/236* | (2011.01) | |
| *H04N 21/242* | (2011.01) | |
| *H04N 21/845* | (2011.01) | |
| *H04N 21/854* | (2011.01) | |
| *H04N 21/24* | (2011.01) | |

(52) U.S. Cl.
CPC ..... *H04N 21/4302* (2013.01); *H04N 21/23406* (2013.01); *H04N 21/234345* (2013.01); *H04N 21/234381* (2013.01); *H04N 21/23611* (2013.01); *H04N 21/242* (2013.01); *H04N 21/8456* (2013.01); *H04N 21/85406* (2013.01); *H04N 21/2401* (2013.01)
USPC ................. 725/89; 725/78; 725/93; 725/94

(58) Field of Classification Search
USPC .......................................... 725/78, 89, 93–94
See application file for complete search history.

(56) References Cited

U.S. PATENT DOCUMENTS

| | | | |
|---|---|---|---|
| 2004/0068588 A1* | 4/2004 | Kowalski et al. | 709/248 |
| 2006/0002681 A1* | 1/2006 | Spilo et al. | 386/46 |
| 2011/0016172 A1* | 1/2011 | Shah | 709/203 |
| 2011/0276648 A1* | 11/2011 | Soldan | 709/208 |
| 2012/0011550 A1* | 1/2012 | Holland | 725/78 |
| 2013/0173742 A1* | 7/2013 | Thomas et al. | 709/217 |
| 2014/0025830 A1* | 1/2014 | Grinshpun et al. | 709/227 |

* cited by examiner

*Primary Examiner* — Gigi L Dubasky
(74) *Attorney, Agent, or Firm* — Ballard Spahr, LLP

(57) ABSTRACT

Methods and system for providing content are disclosed. One method can comprise receiving a request for data at a first time, wherein the data comprises a first time duration, determining a buffer size based upon the first time duration, and determining a playback window based upon the determined buffer size and the first time. The method can also comprise synchronizing presentation of content on a plurality of devices.

20 Claims, 6 Drawing Sheets

METHODS AND SYSTEMS FOR CONTENT CONTROL

BACKGROUND

Multiple devices can stream the same content to multiple users. As such, users may wish to concurrently watch the same content, for example, on distinct devices and/or in different locations. Accordingly, synchronization between content rendered or presented via multiple devices is desirable, for example, for social interactions between users.

For synchronization feedback, certain content systems may require users to relay the current playback position via a return channel or feedback loop. A server can then provide feedback to the user regarding adjustments to the playback in order to facilitate synchronization, but such systems suffer from many deficiencies. This disclosure addresses such and other shortcomings related to control of content delivery.

SUMMARY

It is to be understood that both the following summary and the following detailed description are exemplary and explanatory only and are not restrictive, as claimed. Provided are methods and systems for, in one aspect, controlling content on one or more user devices. Provided are methods and systems for, in another aspect, substantially synchronizing content rendered via one or more user devices.

In an aspect, a content deliver/device such as a streaming device or server can capture and analyze when a user or user device requests new blocks of content. In one aspect, the buffer size of the user device can be estimated, or the user device can include buffer size information during a request for content, thereby maximizing accuracy of the buffer size estimate. In an aspect, a playback position or playback window of content rendered via the user device can be determined based on the buffer size associated with the user device.

In an aspect, a device for the content delivery can control content being delivered to one or more user devices based upon one or more of the estimated buffer size and the determined playback window of one or more devices. As an example, a buffering event can be generated or artificially generated (e.g., transmitting information indicating a buffer event, but no actual buffer event is generated) for one or more user devices that are out of synchronization with other user devices. As such, content rendered or presented via the user devices receiving the buffering event or artificial buffering event can be delayed or advanced such that each or a group of the devices can be synchronized by receiving and or rendering a particular data block or content at substantially the same time. As a further example, one or more special content blocks can be encoded at faster than real time speed for a first device rendering content that is offset in time e.g., trailing) relative to content rendered via a second device. Accordingly, the first device can process the one or more special content blocks to cause the content rendered via the trailing device to advance or "catch up" to or substantially synchronize with the content rendered via the second device. In an aspect, the encoding of one or more special content blocks be implemented to, among other things, can manipulate playback speed and or audio pitch such that the manipulation to the content is substantially unrecognized by a user.

In an aspect, a method can comprise receiving a request for data at a first time. As an example, the data can comprise a first time duration. As a further example, a buffer size can be determined based upon the first time duration. A playback window can be determined based upon the determined buffer size and the first time.

In another aspect, a method can comprise determining a first playback window and a second playback window. As an example, an offset between the first playback window and the second playback window can be determined. As a further example, first content and second content can be substantially synchronized based upon the determined offset.

In a further aspect, a method can comprise transmitting first content to a first user. The first content can be rendered to the first user at a first time. Second content can be transmitted to a second user. The second content can be rendered to the second user at a second time. As an example, an offset of the first time and the second time can be determined. As a further example, the first content rendered to the first user and the second content rendered to the second user can be substantially synchronized based upon the determined offset.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
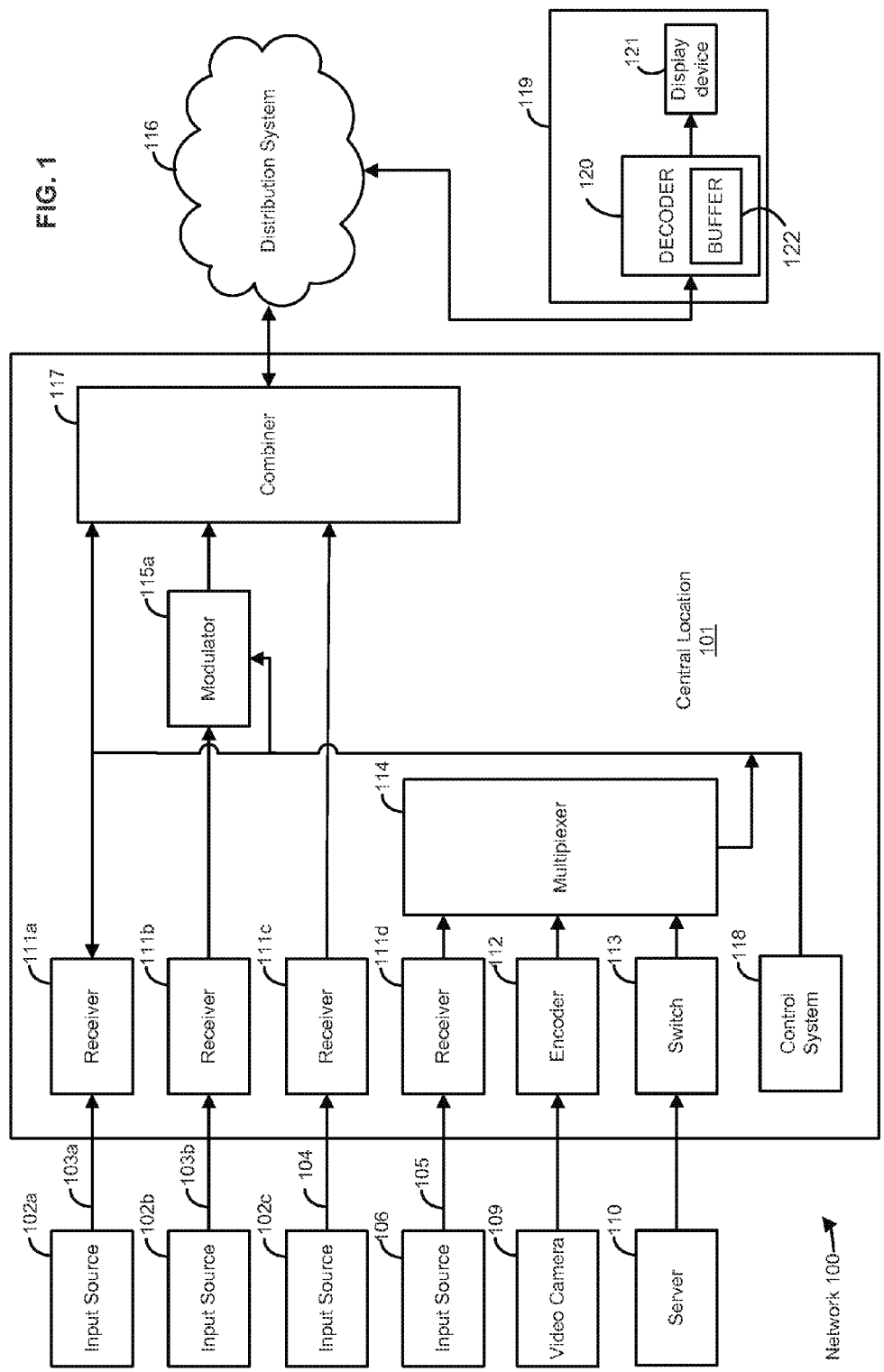
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps, "Exemplary" means "an example of" and is not intended to convey an indication of a preferred or ideal embodiment. "Such as" is not used in a restrictive sense, but for explanatory purposes.

To manage and deliver large data files in a streaming environment, streaming technologies that involve an adaptive data stream can divide the data stream into smaller video fragments that are, for example, a few seconds long. The fragments can then be arranged sequentially to form a video in the streaming client. The fragments can comprise varying video quality and there can be multiple fragments corresponding to a single portion of a stream, each at different levels of quality. In an aspect, adaptive streaming systems, according to the present disclosure, can adapt to network and client changes by loading successive fragments in a higher or lower quality, as needed.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, provided are methods and systems for controlling content transmitted to a user location. In an aspect, a data stream transmitted to the user location can comprise a repeatedly embedded placement signal to indicate that a particular content should be transmitted to the user location.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming) from multiple sources. The central location 101 can combine the content from the various sources and can distribute the content to user locations, such as location 119, via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content can also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111e, hid that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115a for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators tier setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the decoder 120 can receive and process embedded markers, flags, and signals in the content data stream for controlling a content received by the decoder 120.

In an aspect, the decoder 120 or communication terminal can comprise a buffer 122. As an example, the buffer 122 can comprise a memory or a storage device. As a further example, a number of content fragments can be loaded into the buffer 122 and stored for playback or processing by the associated decoder 120. However, other data, content, and/or information can be stored in the buffer 122 such as advertisements and alternative content, for example. In an aspect, the buffer 122 can be separate from the decoder 120. For example, the buffer 122 can be located upstream of the decoder 120 and downstream of the distribution system 116. As a further example, the buffer 122 can store information to be transmitted to any number of decoders 120 or other recipient devices. Accordingly, the decoder 120 can retrieve the content fragments from the buffer 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device such as a laptop computer, PDA, smartphone, GPS, vehicle entertainment system, and/or portable media player. The network of FIG. 1 is illustrative only and other types of networks and configurations may be used to implement the methods and systems provided.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

The output of a single MPEG audio and/or video coder may be a transport stream, comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of data, audio and/or video PESs. In addition to the compressed audio, video and data, a transport stream may include metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi-program transport stream carries many different programs, and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks. In an aspect, the transport stream or other data stream can comprise event notifiers, tags, flags, or signals. As an example, the event notifier can represent a time slot for an advertisement or an alternate content. As a further example, the event notifier can represent a blackout of content. In an aspect, the event notifiers can be dependent upon the user location receiving the stream. As an example, a national advertisement can be replaced by a local advertisement in response to an event notifier. As a further example, a local programming can be subject to blackout, while other locales have permission to present the programming.

In an aspect, provided are methods and systems for controlling content transmitted to one or more devices. In an aspect, one or more devices can comprise a buffer for storing a pre-determined amount of content for processing. Accordingly, the methods and systems can determine and/or estimate a buffer size of one or more devices and can control content delivery based upon the determined buffer size(s).

Figure 2:
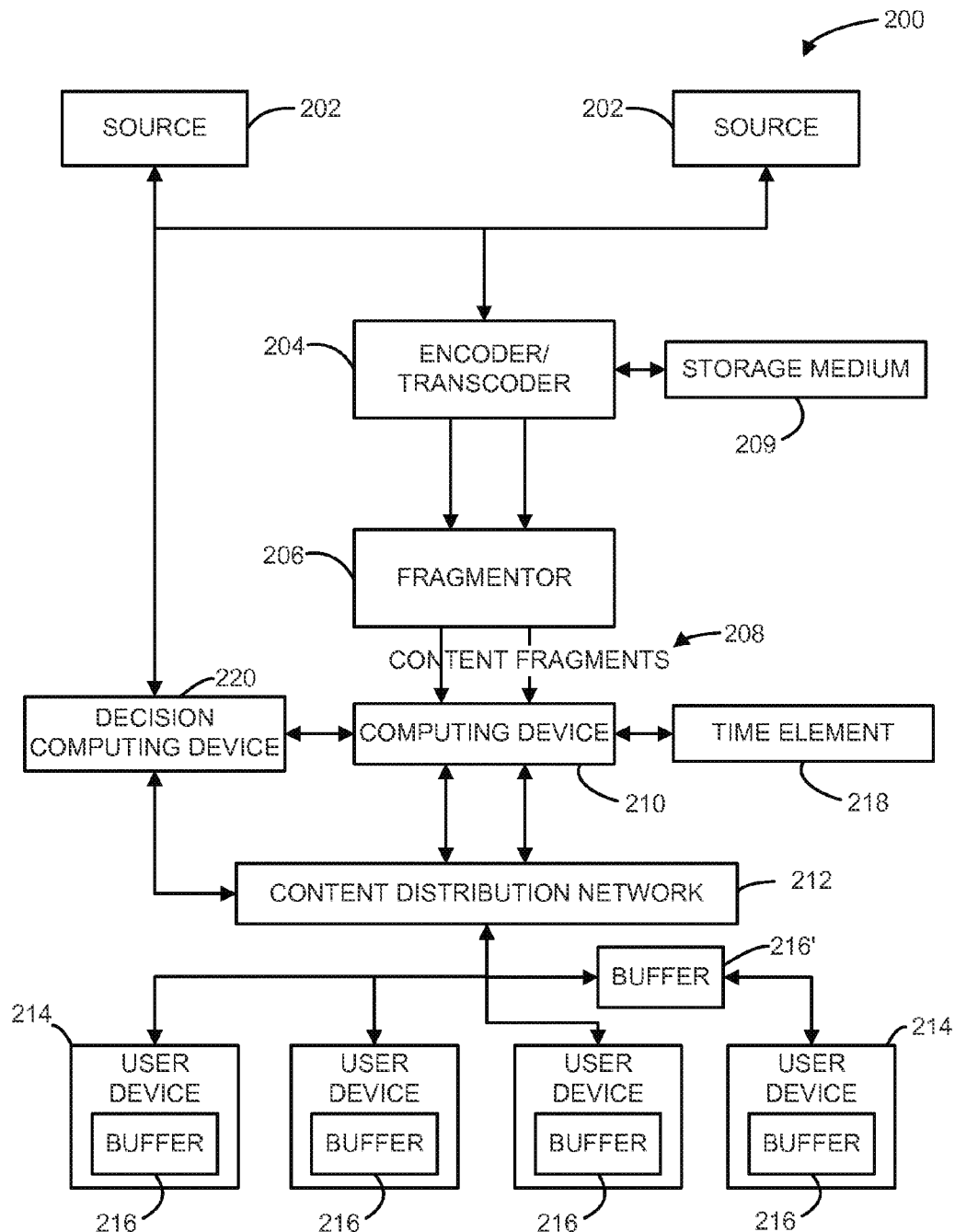
FIG. 2 is a block diagram of an exemplary system architecture.

FIG. 2 is a block diagram of an exemplary system 200. The system 200 can comprise one or more data sources 202 for accessing and/or transmitting data, such as a data stream. An encoder 204 can be in signal communication with the data source 202. A fragmentor 206 can be in signal communication with the encoder 204. As an example, the encoder 204 and the fragmentor 206 can be integrated as part of a unitary device. However, the encoder 204 and the fragmentor 206 can be separate and distinct components.

In an aspect, the data sources 202 can comprise a content provider for providing one or more of audio content, video content, data, news feeds, sports programming, advertisements, and the like. As an example, the data sources 202 can be configured to transmit the data (e.g., as a stream, fragments, files, etc.) to various end-users. In an aspect, one or more data sources 202 can comprise an advertisement database having a plurality of advertisements stored therein or capable of accessing advertisement stored elsewhere. As an example, the advertisement database can comprise a plurality of video advertisements. As a further example, the plurality of advertisements can each have a particular time duration associated therewith. In an aspect, the time duration associated with the advertisements or alternate content can be varied in duration for application in various time dependent circumstances.

As an example, one or more of the data sources 202 can comprise a network data feed transmitting the data stream to users such as subscribers or clients. As a further example, the one or more data sources 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate to an output of multiple (lower) bitrates. As an example, the encoder 204 can convert the data stream from the input format received from the data source (such as MPEG-2, QAM, etc.) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data sources 202 and encode/transcode information onto the data stream. In an exemplary embodiment, the encoder 204 adds information to the signal relating to content fragments 208 or data blocks. In an aspect, a buffer or storage medium 209 can be in communication with the encoder 204 or integrated therewith. As an example, data received by the encoder 204 can be buffered or stored in the storage medium 209. As a further example, data blocks or content fragments 208 processed by the encoder 204 can be buffered or stored. In an aspect, the encoder 204 can synchronize data and/or content from a plurality of data sources 202 by managing the timing of processing and/or transmission of processed data. As an example, the encoder 204 can delay processing and/or transmission of a particular data received from one data source 202 in order to allow data from another data source 202 to synchronize. In an aspect, one or more of the content fragments 208 can comprise a presentation time range representing a portion of content. As an example, a sequence of the content fragments 208 can be processed to present content to a user. As a further example, each of the content fragments 208 can be sequentially processed so that the content is presented in a preset order. Other data and time management techniques can be used.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a computing device 210 through a content distribution network 212 to user devices 214 (e.g. the decoder 120). In an aspect, the computing device 210 can be an origin Hypertext Transfer Protocol (HTTP) computing device. However, other computing devices can be used, such as a rate adaptive streaming server. As an example, the fragmentor 206 can communicate with the computing device 210 using the POST method of the HTTP. As a further example, the computing device 210 can implement the functions described relative to the encoder 204 and/or the fragmentor. However, other protocols, configurations, and communication methods can be used.

In an exemplary embodiment, the fragmentor 206 separates or fragments the data stream into each of the content fragments 208 represented by the data stream based upon information encoded in the data stream by the encoder 204. In an additional exemplary embodiment, the fragmentor 206 accesses the information encoded/inserted in the data stream by the encoder 204 to define the content fragments 208 based on, among other things, boundaries, grouping, timing, or duration. Once the content fragments 208 are generated, the content fragments 208 can be transmitted to the content distribution network (CDN) 212 for delivery to the user devices 214 for consumption (e.g., playback). As an example, the computing device 210, CDN 212, and the user devices 214 can intercommunicate using the GET method of HTTP. However, other protocols and communication methods can be used.

In an aspect, one or more of the user devices 214 can comprise a buffer 216. As an example, the buffer 216 can comprise a memory or a storage device. As a further example, a number of the content fragments 208 can be loaded into the buffer 216 and stored for playback by the associated user device 214. Accordingly, the user device 214 can retrieve the content fragments 208 from the buffer 216 for playback without having to communicate with the CDN 212, thereby reducing data stream, which can comprise audio, video, or other data from the computing device 210 with a regular cadence (e.g., every two seconds, four seconds, ten seconds). Other data, content, and/or information can be stored in the buffer 216 such as advertisements and alternative content, for example.

In an aspect, a buffer 216' can be separate from the user device 214. For example, the buffer 216 can be located upstream of the user device 214 and downstream of the CDN 212. As a further example, the buffer 216' can store information to be transmitted to any number of user devices 214 or other recipient devices. Accordingly, the user device 214 can retrieve the content fragments 208 from the buffer 216' for playback without having to communicate with the CDN 212, thereby reducing latency in playback. In an aspect, the content fragments 208 can be retrieved from buffer 216 and 216' simultaneously or in various sequences.

In an aspect, a time element 218 can be in communication with one or more of the encoder 204, the fragmentor 206, and the computing device 210 to provide a timing reference thereto. As an example, the time element 218 can be a clock. As a further example, the time element 218 can transmit information to one or more of the encoder 204, the fragmentor 206, and the computing device 210 for associating a time stamp with a particular event received by one or more of the encoder 204, the fragmentor 206, and the computing device 210. In an aspect, one or more of the encoder 204, the fragmentor 206, and the computing device 210 can cooperate with the time element 218 to associate a time stamp with events having an effect on the content delivered to the user devices 214, such as, for example, content or data request, content or data download, a channel tune, a remote tune, remote control events, playpoint audits, playback events, program events including a program start time and/or end time and/or a commercial/intermission time, and/or playlist timing events, and the like. In an aspect, content having a particular time duration can comprise one or more data blocks, wherein each data block represents a portion of the overall time duration of the content. For example, a thirty second commercial can be represented by three ten second data blocks. As a further example, a first data block can represent the first ten seconds of content presentation, a second data block can represent the next sequential ten seconds content presentation, and a third data block can represent the last ten seconds of content presentation. Accordingly, when the three data blocks are processed sequentially, the full thirty seconds of content can be presented.

In an aspect, a decision computing device 220 can be in communication with one or more of the user devices 214. In an aspect, the decision computing device 220 can be in communication with one or more data sources 202, an origin server, computing device 210, and/or the content distribution network 212. As an example, the decision computing device 220 can be a synchronization decision computing device for controlling content blocks transmitted to one or more of the user devices 214. In an aspect, decision computing device 220 can log and/or analyze a time at which one or more of the user devices 214 request content. As an example, the decision computing device 220 can receive an estimation of the buffer size of the requesting one of the user devices 214 and estimate a portion of playback stream currently rendered by one or more of the user devices 214. As such, the content being transmitted to the one or more of the user devices 214 can be controlled to substantially synchronize content being rendered via a plurality of the user devices 214.

In an aspect, the decision computing device 220 can determine whether particular data should be transmitted to one or more of the user devices 214. As an example, the content data can be routed through the CDN 212 or other network. As a further example, the content data can be retrieved directly from one or more of the data sources 202 or from an origin computing device such as the computing device 210. In an aspect, content data can be spliced into the content fragments 208 received at the user device 214 based upon an instruction from the decision computing device 220. As an example, computing device 210 can be configured to operate, at least in part, as the decision computing device 220.

In an aspect, provided are methods and systems for controlling content transmitted to one or more devices. In an aspect, one or more devices can request one or more data blocks from a content source, origin server, streaming server, rate adaptive server, or the like. Accordingly, the methods and systems can determine and/or estimate a current playback window of content for the one or more devices and can control content delivery based upon the determined playback window.

Figure 3:
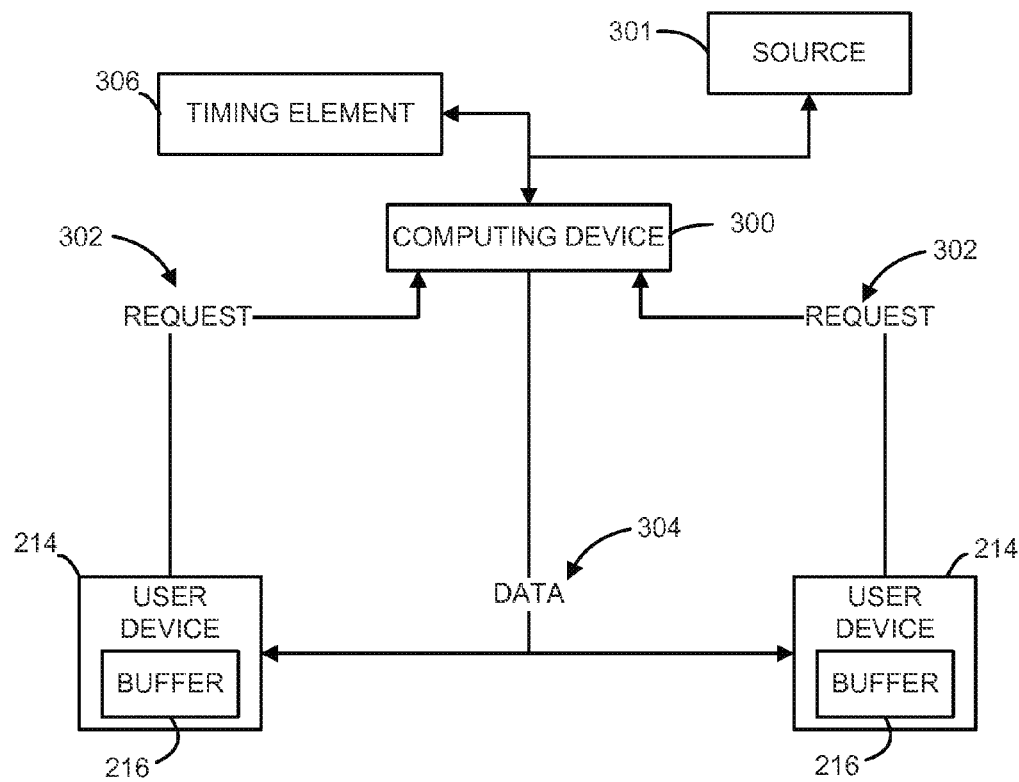
FIG. 3 is a block diagram of an exemplary system architecture.

FIG. 3 is a block diagram of an exemplary system. In an aspect, a computing device 300 (e.g., origin server, streaming server, etc.) can be in communication with one or more of the user devices 214. In an aspect, the computing device 300 can be in communication with one or more data sources 301 and/or content providers. As an example, the computing device 300 can be a synchronization decision computing device for controlling data blocks transmitted to one or more of the user devices 214. In an aspect, the computing device 300 can log and/or analyze one or more content requests 302 received from one or more of the user devices 214 or other devices. As an example, the computing device 300 can be provided with an estimation of the buffer size of one or more user devices 214 (e.g., the device that requests content and estimate a portion of the playback stream currently rendered by one or more of the user devices 214. As such, one or more data blocks 304 or content blocks can be transmitted to the one or more of the user devices 214 to substantially synchronize content being rendered via a plurality of the user devices 214. In an aspect, a time element 306 can be in communication with the computing device 300 to provide a timing reference thereto. As an example, the time element 306 can be a clock. As a further example, the time element 306 can transmit information to the computing device 300 for associating a time stamp with a particular event received by of the computing device 300. In an aspect, the computing device 300 can cooperate with the time element 306 to associate a time stamp with events having an effect on the content delivered to the user devices 214. As an example, events can comprise data or content requests 302, content or data delivery or download, a channel tune, a remote tune, remote control events, playpoint audits, playback events, program events including a program start time and/or end time and/or a commercial/intermission time, and/or playlist timing events, and the like.

In an aspect, computing device 300 can determine whether particular data blocks 304 (e.g., content block, special content block, advertisement, blackout screen, alternative programming content, etc.) should be transmitted to one or more of the user devices 214. As an example, the data blocks 304 can be transmitted directly to the user device 214 from the content source 301. However, the data blocks 304 can be routed through a network. As a further example, the data blocks 304 can be retrieved directly from a computing device such as the computing device 300. In an aspect, data blocks 300 can be spliced into the content fragments received at the user device 214 based upon an instruction from the computing device 300. As an example, the computing device 300 can be a rate adaptive computing device and can encode the requested data blocks 304 into fragments. Each fragment can be encoded based on one or more profile settings for recipient devices, users, and/or content players. Each fragment can comprise an encoding rate and fragment duration.

In an aspect, content requests 302 can be received based upon a pre-defined sequence. As an example, one or more user devices 214 can request a next available data block 304 from a sequence of data blocks 304. As a further example, one or more user devices can request data blocks 304 to fill the associated buffer 216. As another example, the buffer 216 can be filled based on the client configuration of the requesting user device 214. In an aspect, one or more user devices 214 can continue to request the next data block in a particular content stream at predictable times based upon a consumption rate of content by the one or more user devices 214. In an aspect, the computing device 300 can use information relating to the received content requests 302 to determine a playback window (e.g., position or range of positions in the content stream currently being rendered) for the associated user device 214. As an example, the computing device 300 can use time of block request, time of block download, presentation time duration, presentation time range, and/or estimated buffer length to determine a playback window. In an aspect, playback window estimation can be used to provide boundaries (e.g., min or max) playback position estimates.

In an aspect, a boundary of a playback window can be defined by subtracting the buffer length or size of the requesting device from a time (e.g., calculated time, time stamp, etc.) associated with the last data block requested. In an aspect, the time associated with the last data block requested can be defined by a receipt of the request for the data block, a completion of transmission of the requested data block, a presentation time duration represented by the data block, or a presentation time range represented by the data block, or a combination thereof.

As an example, the requesting device can have a buffer length of ten seconds of presentation (e.g., five data blocks having two second presentation time duration). As such, when the requesting device requests a new data block having a two second presentation time duration, it can be assumed that the buffer is not full and the requesting device could have as many as four other two second data blocks currently in its buffer. As such, a boundary of the playback window for the requesting device can be defined by subtracting the buffer length (e.g., ten seconds) from the time the request for the new data block was received. For example, if the last request is for data block 70 and the buffer length of the requesting device is five data blocks, then the most that could be in the buffer for the requesting device are blocks 69, 68, 67, and 66. As such, the playback window can be currently presenting content from data block 66. In an aspect, the playback window of a plurality of devices can be compared to determine an offset between two or more playback windows. If an offset between the two or more playback windows is determined, the delivery of data blocks or the data blocks themselves can be modified in order to minimize the offset between the playback windows.

As another example, the last data block requested can represent a presentation time range of 1:35:05-1:35:10 (one hour thirty-five minutes and five seconds to one hour thirty-five minutes and ten seconds) of a represented content. As an example, the start of the playback window can be estimated by subtracting the buffer length (e.g., ten seconds) from the end of the time range of the last data block requested. Accordingly, the start of the playback window can be estimated at 1:35:00 (one hour thirty-five minutes and zero seconds).

In an aspect, a boundary of a playback window can be defined by a time prior to at least a portion of the presentation time range represented by latest data block requested. In another aspect, content may not be presented from the latest data block requested. As an example, while a device is downloading or otherwise receiving a data block, the device may not be playing any portion of the currently downloading data block. As another example, this assumption is due in part to content often being encoded in variable bit rate (VBR), so that the first 50-100 packets of one data block might correlate to 10% of the timeframe for that data block. As a further example, a device may take one second to download a complete data block. If the data block is 50% downloaded, the downloaded portion of the data block may only provide 100 ms of playtime and the device will buffer underrun because it took 500 ms to download 50% of the data block. Accordingly, applying the above assumption of not starting playback mid-block, then the last data block request sent by a device will not be playing back from the requested data block. Assuming the device starts playback during mid-block download, then it can be assumed that a particular packet currently being downloaded is not in current playback. As an example, if a data block is segmented into 100 packets, while a device is downloading packet 56, the device may not be playing content from packet 56.

In an aspect, the computing device 300 can use one or more of the following rules to determine a playback window associated with one or more requesting devices:

1) a start of playback window can be defined by subtracting the buffer length of the requesting device from a time (e.g., calculated time, time stamp, etc.) associated with the last data block requested. In an aspect, the time associated with the last data block requested can be defined by a receipt of the request for the data block, a completion of transmission of the requested data block, a presentation time duration represented by the data block, or a presentation time range represented by the data block, or a combination thereof; and/or 2) content may not be rendered from at least a portion of the presentation time represented by latest data block requested.

As an example, if a first requesting device has a buffer length of five seconds and requests a data block representing a presentation time range of content that is 1:30:01-1:30:02 (one hour thirty minutes and one second through one hour thirty minutes and two seconds), then the playback window for the first requesting device can be estimated to be 1:29:57 (1:30:02 minus five second buffer length) to 1:30:00 (a time prior to the last data block requested). As a further example, if a second requesting device has a buffer length of five seconds and requests a data block representing a presentation time range of content that is 1:30:30-1:30:31, then the playback window for the first requesting device can be estimated to be 1:30:26 (1:30:31 minus five second buffer length) to 1:30:29 (a time prior to the last data block requested). In the above example, the playback window for the first requesting device and the second requesting device are not completely synchronized. Accordingly, the data blocks delivered to one or more of the first requesting device and the second requesting device can be modified in order to minimize the offset between the playback windows.

Figure 4:
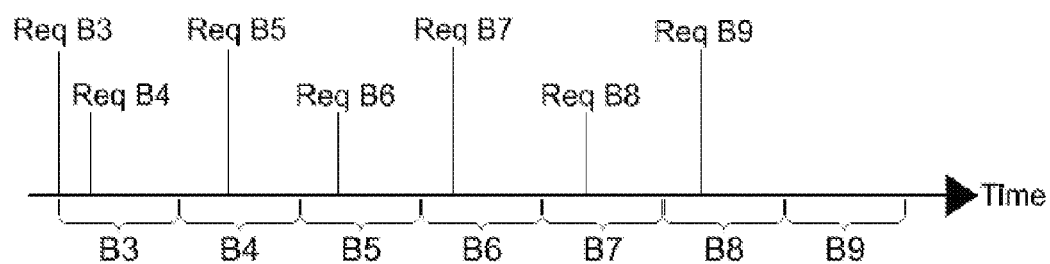
FIG. 4 is a representation of an exemplary content delivery timeline.

FIG. 4 illustrates an exemplary timeline representing content requests ReqB3, ReqB4, ReqB5, ReqB6, ReqB7, ReqB8, ReqB9 and playback windows B3, B4, B5, B6, B7, B8, B9 for the requested content. As shown early in the timeline, content requests ReqB3 and RegB4 are in relative close proximity to each other since requesting users and/or devices may have an empty buffer at the start of streaming and can request a plurality of data and/or content to load in the respective buffer. In an aspect, as the subsequent content requests are received, a computing device such as computing device 300 (FIG. 3) can track and/or log the presentation time range represented by the data block(s) initially requested at the start of a content stream. In this way, a buffer length for the requesting device can be determined or estimated. As an example, buffer length can be calculated by the number of requested data blocks multiplied by block length. As a further example, buffer length can be calculated by the number of requested data blocks not in playback multiplied by block length.

In an aspect, if block lengths are one second in duration and a device requests eight data blocks within one second, if it is assumed that the requesting device has not completed playing back a full data block, then the requesting device could not have purged its buffer of any of the received data blocks. As an example, since the device requested eight data blocks it has at least that much room in its buffer for the requested data (e.g., a minimum buffer length of eight seconds assuming one second per data block).

As an example, using the determined or estimated buffer length, a current playback position in time can be determined by the by the following rules:
1) a start of playback window can be defined by subtracting the buffer length of the requesting device from a time (e.g., calculated time, time stamp, etc.) associated with the last data block requested. In an aspect, the time associated with the last data block requested can be defined by it receipt of the request for the data block, a completion of transmission of the requested data block, a presentation time duration represented by the data block, or a presentation time range represented by the data block, or a combination thereof; and/or
2) content may not be rendered from at least a portion of the presentation time represented by latest data block requested.

Figure 5:
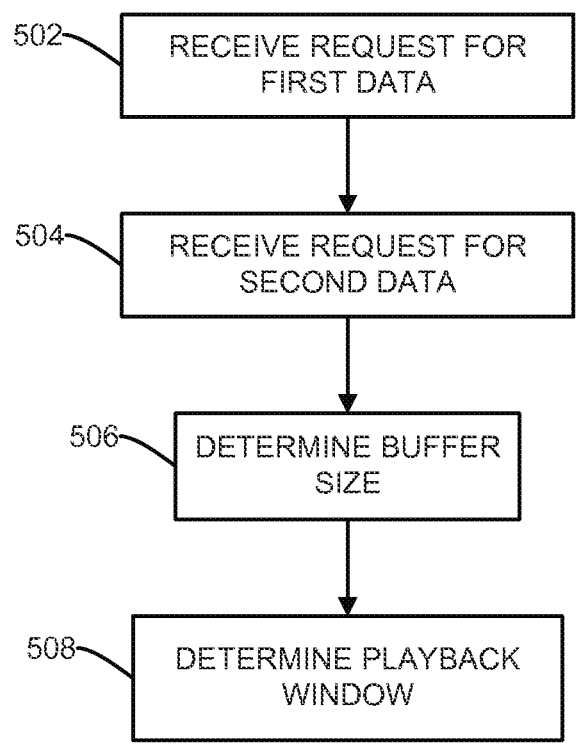
FIG. 5 is a flow chart of an exemplary method.

FIG. 5 illustrates an exemplary method. The method illustrated in FIG. 5 will be discussed in reference to FIGS. 1-4, for example only. In step 502, a request for first data can be received. As an example, the request for first data can be received at a first time. In an aspect, the first data can comprise a first time duration such as a content rendering or presentation time duration. As an example, the first data can comprise one or more data blocks of content. As a further example, all or a portion of the first data can comprise streamable content.

In step 504, a request for second data can be received. As an example, the request for second data can be received at a second time. In an aspect, the second data can comprise a second time duration such as content rendering or presentation time duration. As an example, the second data can comprise one or more data blocks of content. As a further example, all or a portion of the second data can comprise of streamable content.

In step 506, a buffer size can be determined. In an aspect, the determination of the buffer size can be based upon one or more of the first time duration and the second time duration. As an example, determining the buffer size can comprise determining an amount of data requested with a pre-determined time period. As a further example, a device can request data and/or content to fill a buffer associated with the requesting device. In an aspect, the buffer size can be determined by monitoring or tracking the requested data within a particular time frame. As an example, a buffer length for the requesting device can be determined or estimated (e.g., buffer length=number of requested data blocks*block length). As a further example, one device may request five initial data blocks, each data block being two seconds in length, to fill an associated buffer of ten seconds of content length, while another device may request one data block filling a limited buffer of two seconds of content.

In step 508, a playback window can be determined. As an example, using the determined or estimated buffer length, a current playback position in time can be determined by one or more of the following rules:
1) a start of playback window can be defined by subtracting the buffer length of the requesting device from a time e.g., calculated time, time stamp, etc.) associated with the last data block requested. In an aspect, the time associated with the last data block requested can be defined by a receipt of the request for the data block, a completion of transmission of the requested data block, a presentation time duration represented by the data block, or a presentation time range represented by the data block, or a combination thereof, and/or
2) content may not be rendered from at least a portion of the presentation time represented by latest data block requested.

In an aspect, the span of streaming data can comprise one or more time stamps. As an example, the one or more time stamps can be within a time period defined by an end time of the first data less the buffer size and a start time of the second data. In an aspect, the determination of the playback window can be based upon the determined buffer size and one or more of the first time and the second time from steps 502-506.

In an aspect, a playback window can be determined for each of a plurality of devices. The devices may be in a group based on geographical or social media driven associations. Accordingly, content delivered to each of the plurality of distinct devices can be controlled in such a manner to substantially synchronize the content playback windows of each of the plurality of distinct devices.

Figure 6:
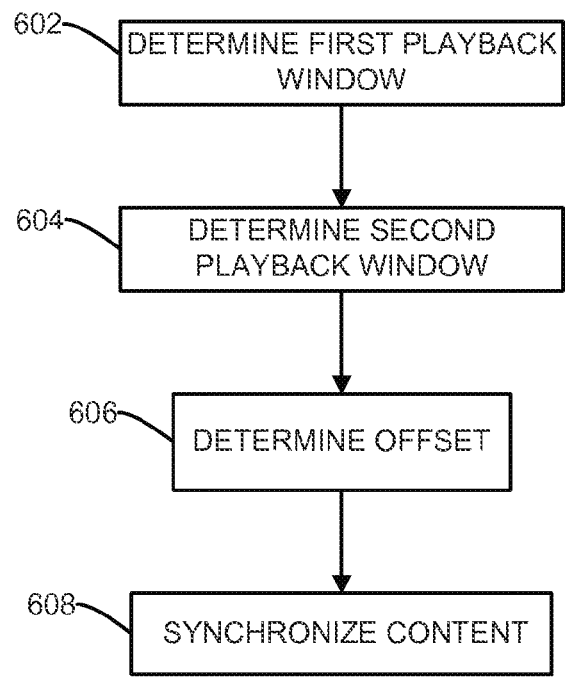
FIG. 6 is a flow chart of an exemplary method.

FIG. 6 illustrates an exemplary method for substantially synchronizing content rendered via a plurality of devices. The method illustrated in FIG. 6 will be discussed in reference to FIGS. 1-4, for example only. In step 602, a first playback window can be determined for a first device. In an aspect, the first playback window can comprise a first span or sequence of data blocks. As an example, determining a first playback window can comprise receiving a request for first data at a first time, wherein the first data includes a first time duration, and receiving a request for second data at a second time, wherein the second data includes a second time duration. As a further example, determining a first playback window can comprise determining a first buffer size or first buffer length based upon one or more of the first time duration and the second time duration.

In step 604, a second playback window can be determined for a second device. In an aspect, the second playback window can comprise a second span or sequence of data blocks. As an example, determining a second playback window can comprise receiving a request for third data at a third time, wherein the third data includes a third time duration, and receiving a request for fourth data at a second time, wherein the fourth data includes a fourth time duration. As a further example, determining a second playback window can comprise determining a second buffer size or second buffer length based upon one or more of the third time duration and the fourth time duration.

In step 606, an offset between the first playback window and the second playback window can be determined. In an aspect, determining an offset between the first playback window and the second playback window can comprise determining a time difference between at least a portion of the first playback window and at least a portion of the second playback window. As an example, two or more devices can be requesting and rendering particular content. However, due to various factors including buffer size and rendering rates, content rendered via one device may not be synchronized with content rendered via another device. Accordingly, the playback window of content via each of the devices comprises a temporal offset. By determining the offset, the content rendered via two or more devices can be substantially synchronized.

In step 608, first content can be substantially synchronized with second content based upon the determined offset of step 606. In an aspect, the first content can be rendered to a first user device and the second content can be rendered or presented to a second user device. As an example, substantially synchronizing first content with second content can comprise generating a buffering event or artificial buffering event. As a further example, an upstream device (e.g., an encoder, computing device, server, etc.) can comprise one or more encoded or transcoded data blocks that are ready for transmission. However, the upstream device can transmit an error or artificial buffering event to one or more requesting devices instead of the requested data block. In this way, the processing of data blocks and/or playback position of content processed by the requesting device is manipulated to facilitate synchronization with another device. As a further example, a buffering event can facilitate a delay in the processing and rendering of content by a particular device in order to allow content rendered via another device to "catch up." In an aspect, data blocks can be added to a buffer or removed from a buffer to alter the processing of the buffered content.

In an aspect, substantially synchronizing first content with second content can comprise encoding at least a portion of one or more of the first content and the second content with a modified playback speed. As an example, the modified playback speed can be faster than real-time speed. As another example, the modified playback speed can be slower than real-time speed. In an aspect, substantially synchronizing first content with second content can comprise manipulating (e.g., adding, substituting, removing, altering, etc.) content frames from one or more of the first content and the second content.

As an example, an audio track of the first content and/or the second content can be modified to control a pitch such that a change in the playback of an associated video would not alter the perceived audio. As a further example, if a content block in first content is modified to playback at faster than real-time speed, the audio could be perceived as having a higher pitch than intended. Accordingly, by speeding up the playback speed and lowering a pitch in an audio portion of the content, the change in the perceived audio can be minimized.

In an aspect, content can be processed, such as encoded or transcoded, to generate a modified data rate stream to affect playback speed and/or playback position of content. As an example, content can be transcoded at a modified data rate (e.g., 200 kbps, 400 kbps, 800 kbps, 1500 kbps, 3 mbps, etc.) based upon the lowest bitrate rate or average bitrate a device requested in a pre-determined number of previously requested blocks. In an aspect, regardless of the data rate the device requests, content can be transmitted at the modified data rate. In an aspect, bitrate requests from one or more devices can be monitored. For example, when a particular device requests a series of decreasing bitrates, the request can indicate a buffer limitation such as a buffer near capacity. As a further example, delivery of content to one or more devices can be controlled in response to the monitored data rate requests.

In an aspect, the computing device 300 can use the rules and/or aspects defined herein to determine a playback window e.g., position or range of positions in the content stream currently being rendered) for one or more requesting devices (e.g., user device 214). As an example, if a first requesting device has a buffer length of five seconds and requests a data block representing a presentation time range of content that is 1:30:01-1:30:02, then the playback window for the first requesting device can be estimated to be 1:29:57 (130:02 minus five second buffer length) to 1:30:00. As an example, if a second requesting device has a buffer length of five seconds and requests a data block representing a presentation time range of content that is 1:30:30-1:30:31, then the playback window for the first requesting device can be estimated to be 1:30:26 (1:30:31 minus five second buffer length) to 1:30:29. In the above example, the playback window for the first requesting device and the second requesting device are not completely synchronized. Accordingly, the data blocks delivered to one or more of the first requesting device and the second requesting device can be modified in order to modify the offset between the playback windows.

As an example, if a first device is presenting content from a sequential data block representing a presentation time range of content that is 1:30:30-1:30:31 and a second device is presenting content from a sequential data block representing a presentation time range of content that is 1:30:31-1:30:32, the playback window of the first device is offset from the playback window of the second device. In this example, the playback windows are offset by a maximum of two seconds. Accordingly, the transmission of the next sequential data block to the second device can be delayed by up to two seconds in order to substantially synchronize the playback windows. As a further example, the modified data blocks can be transmitted to the first device to accelerate the playback of associated content in order to "catch up" to the playback window of the second device. Other methods and techniques can be used to modify the delivery of data blocks and/or the data blocks themselves.

In an aspect, substantially synchronizing first content and second content can comprise substantially synchronizing playback of the first content presented via a first device within a range from about 33 milliseconds to about 5 seconds of the playback of a respective similar second content via a second device. As an example, the range of playback synchronization can be from about 33 milliseconds to about 500 milliseconds, about 33 milliseconds to about 250 milliseconds, about 250 milliseconds to about 5 seconds, about 500 milliseconds to about 5 seconds, about 250 milliseconds to about 1 second, about 500 milliseconds to about 1 second, about 250 milliseconds to about 2 seconds, about 500 milliseconds to about 2 second, about 250 milliseconds to about 3 seconds, about 500 milliseconds to about 3 seconds, about 250 milliseconds to about 4 seconds, or about 500 milliseconds to about 4 seconds. Other ranges and tolerances can be used. In an aspect, buffer settings and processing speeds can contribute to the effective playback synchronization.

Figure 7:
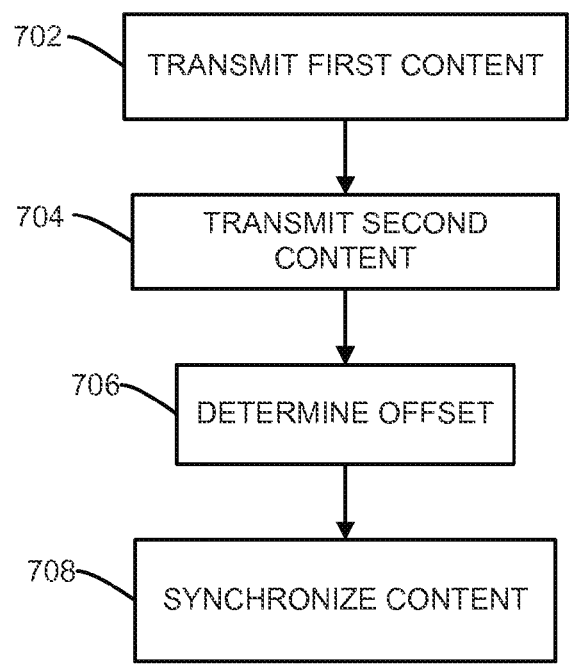
FIG. 7 is a flow chart of an exemplary method.

FIG. 7 illustrates an exemplary method for controlling (e.g., transmitting, synchronizing, etc.) content. The method illustrated in FIG. 7 will be discussed in reference to FIGS. 1-4, for example only. In step 792, first content can be transmitted to a first user device. In an aspect, the first content can be rendered or otherwise presented to the first user device at a first time.

In step 704, second content can be transmitted to a second user device. In an aspect, the second content can be rendered or otherwise presented to the second user device at a second time. As an example, the first content can be the same or similar content as the second content. As a further example, the second content can be contextually and/or temporally related to the first content (e.g., supplemental content).

In step 706, an offset of the first time and the second time can be determined. In an aspect, two or more devices can request and render particular content such as streaming program. However, due to various factors, including buffer size and rendering rates, content rendered via one device may not be synchronized with content rendered via another device. Accordingly, the playback window of content via each of the devices comprises a temporal offset. By determining the offset, the content rendered via two or more devices can be substantially synchronized.

In step 708, the first content rendered to the first user can be substantially synchronized with the second content rendered to the second user. As an example, the synchronization can be based upon the determined offset. In an aspect, the first content can be rendered or otherwise presented to a first user device and the second content can be rendered or otherwise presented to a second user device. As an example, substantially synchronizing first content with second content can comprise generating a buffering event. As a further example, a buffering event can facilitate a delay in the processing and rendering of content by a particular device in order to allow content rendered via another device to "catch up."

In an aspect, substantially synchronizing first content with second content can comprise encoding at least a portion of one or more of the first content and the second content with a modified playback speed. As an example, the modified playback speed can be faster than real-time speed. As another example, the modified playback speed can be slower than real-time speed. In an aspect, substantially synchronizing first content with second content can comprise manipulating (e.g., adding, substituting, removing, altering, etc.) content frames from one or more of the first content and the second content. As an example, an audio track of the first content and/or the second content can be modified to control a pitch such that a change in the playback of an associated video would not alter the perceived audio. As a further example, if a content block on first content is modified to playback at faster than real-time speed, the audio could be perceived as having a higher pitch than intended. Accordingly, by speeding up the playback speed and lowering a pitch in an audio portion of the content, the change in the perceived audio can be minimized.

In an aspect, a content control device (e.g., computing device 210, decision computing device 220, computing device 300) can control the processing and/or delivery of one or more content blocks to one or more devices. As an example, the content control device can decide whether to transmit a requested content block or a specially modified content block. As a further example, the content control device can monitor and/or track one or more devices and to intelligently and dynamically decide which content block should be transmitted to which requesting device.

In an aspect, a second content block can comprise content from a duplicate first content block, but the second content block can be encoded to render at 1.1× speed. As an example, when a device requests the first content block, a decision can be made to transmit the first content block (encoded for real-time rendering) or the second content block (encoded for 1.1× real-time rendering). Any number of duplicate blocks, modified blocks, special ended blocks, and the like can be generated and transmitted to facilitate synchronization of content on various devices. As a further example, commands can be transmitted to the device to control a playback speed of one or more content block to effect synchronization.

In an aspect, one or more data blocks can be can be pre-encoded to render at real-time and/or accelerated/decelerated processing speeds. Accordingly, one or more pre-encoded fast and slow blocks and be stored and selectively transmitted to a device to effect synchronization. As an example, knowledge about network conditions can be determined and used to adjust the encoding and processing of one or more data blocks.

Figure 8:
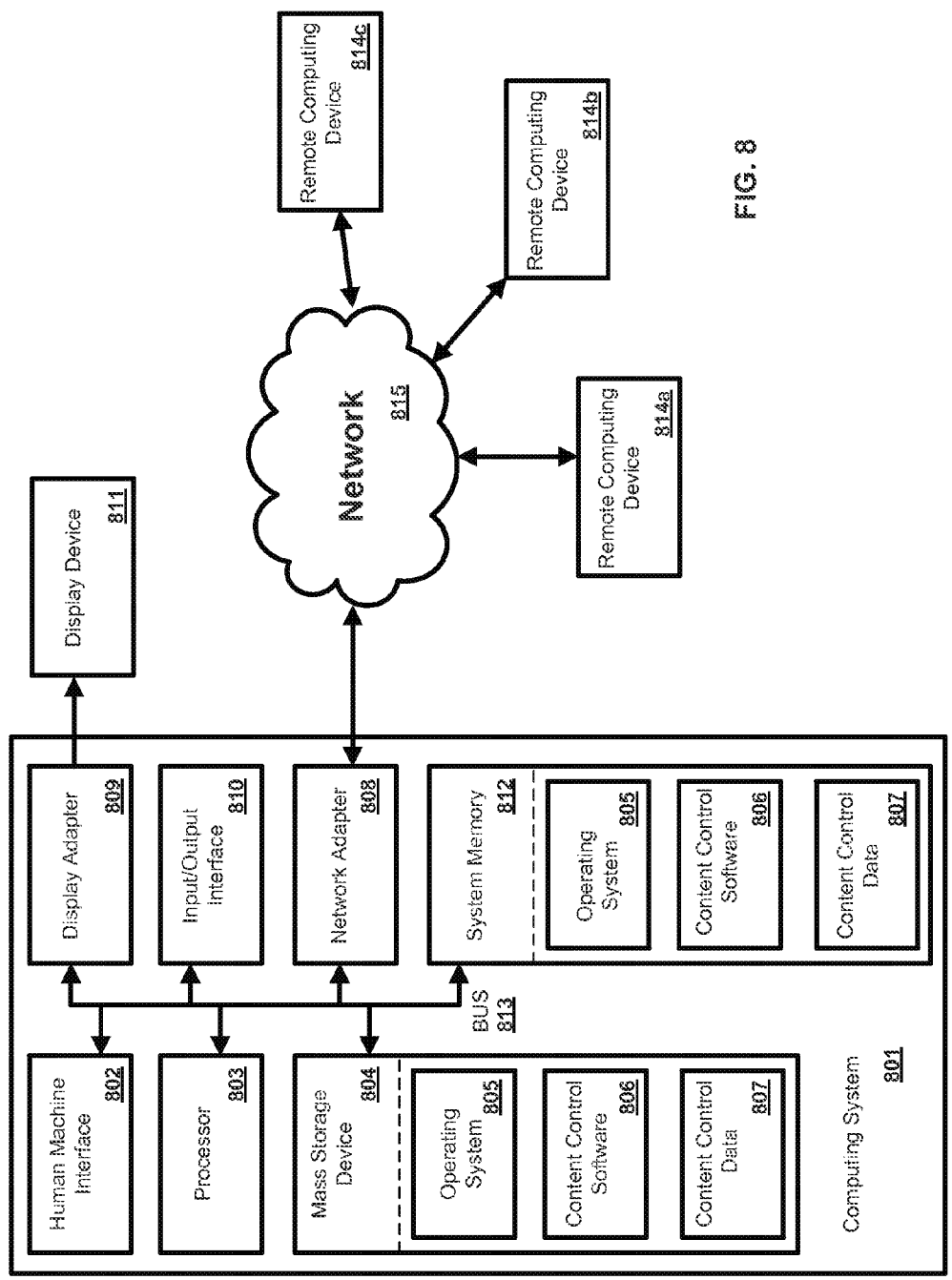
FIG. 8 is a block diagram of an exemplary computing sys em.

In an exemplary aspect, the methods and systems can be implemented on a computing system 801 as illustrated in FIG. 8 and described below. By way of example, computing device 210, the user device 214, and/or the decision computing device 220 of FIG. 2 can be a computing system as illustrated in FIG. 8.

FIG. 8 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices.

Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 801. The components of the computing system 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and buses specified in this description can also be implemented over a wired or wireless network connection and each of the subsystems, including the processor 803, a mass storage device 804, an operating system 805, content control software 806, content control data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computing system 801 typically comprises a variety of computer readable media. Exemplary readable media can be any available media that is accessible by the computing system 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as content control data 807 and/or program modules such as operating system 805 and content control software 806 that are immediately accessible to and/or are presently operated on by the processing unit 803.

In another aspect, the computing system 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computing system 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and content control software 806. Each of the operating system 805 and content control software 806 (or some combination thereof) can comprise elements of the programming and the content control software 806. Content control data 807 can also be stored on the mass storage device 804. Content control data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 807 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing system 801 can have more than one display adapter 809 and the computing system 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computing system 801 via Input/Output Interface 810. Any step and/or result of the methods can be output in any form to an output device. Such output can be any form of visual representation, including, but not limited to, textual, graphical, animation, audio, tactile, and the like. The display 811 and computing system 801 can be part of one device, or separate devices.

The computing system 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computing system 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing system 801, and are executed by the data processor(s) of the computer. An implementation of content control software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning, Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein, it is intended that the specification and examples be considered as exemplary only, with a true scope and spirit being indicated by the following claims.

What is claimed is:

1. A method comprising:
   receiving a request for first data at a first time, wherein the first data has a first time duration;
   receiving a request for second data at a second time, wherein the second data has a second time duration, and wherein the second time duration has an associated end time;
   determining a buffer length based upon one or more of the first time duration and the second time duration;
   determining a first playback window associated with a first user device based on the determined buffer length, wherein a boundary for the first playback window is determined by subtracting the determined buffer length from the end time associated with the second time duration;
   determining a second playback window associated with a second user device;
   determining an offset between the first playback window and the second playback window; and
   synchronizing first content for display at the first user device with second content for display at the second user device based upon the determined offset.

2. The method of claim 1, wherein one or more of the first playback window and the second playback window comprises a span of streaming data.

3. The method of claim 1, wherein determining a second playback window associated with a second user device comprises:
   receiving a request for third data at a third time, wherein the third data has a third time duration;
   receiving a request for fourth data at a fourth time, wherein the fourth data has a fourth time duration; and
   determining a second buffer length of the second user device based upon one or more of the third time duration and the fourth time duration, wherein the second playback window is determined based on the determined second buffer length.

4. The method of claim 1, wherein determining an offset between the first playback window and the second playback window comprises determining a time difference between at least a portion of the first playback window and at least a portion of the second playback window.

5. The method of claim 1, wherein the first content is rendered to a first user and the second content is rendered to a second user.

6. The method of claim 1, wherein synchronizing first content for display at the first user device with second content for display at the second user device comprises generating a buffering event.

7. The method of claim 1, wherein synchronizing first content for display at the first user device with second content for display at the second user device comprises encoding at least a portion of one or more of the first content and the second content with a modified playback speed.

8. The method of claim 1, wherein synchronizing first content for display at the first user device with second content for display at the second user device comprises one or more of adding or removing content frames from one or more of the first content and the second content.

9. The method of claim 6 wherein the buffering event comprises an artificial buffering event.

10. A method comprising:
transmitting first content to a first user, wherein the first content has a first time duration;
transmitting second content to a second user, wherein the second content has a second time duration, and wherein the second time duration has an associated end time;
determining a buffer length based upon one or more of the first time duration and the second time duration;
determining a first playback window associated with a first user device based on the determined buffer length, wherein a boundary for the first playback window is determined by subtracting the determined buffer length from the end time associated with the second time duration;
determining a second playback window associated with a second user device;
determining an offset between the first playback window and the second playback window; and
synchronizing the first content for presentation to the first user with the second content for presentation to the second user based upon the determined offset.

11. The method of claim 10, wherein synchronizing the first content for presentation to the first user with the second content for presentation to the second user based upon the determined offset comprises generating a buffering event.

12. The method of claim 10, wherein synchronizing the first content for presentation to the first user with the second content for presention to the second user based upon the determined offset comprises encoding at least a portion of one or more of the first content and the second content with a modified playback speed.

13. The method of claim 10, wherein synchronizing the first content for presentation to the first user with the second content for presentation to the second user based upon the determined offset comprises one or more of adding or removing content frames from one or more of the first content and the second content.

14. The method of claim 11 wherein the buffering event comprises an artificial buffering event.

15. A system comprising:
a memory to store first data and second data and
a processor, coupled to the memory, to perform steps comprising:
receiving a request for the first data at a first time, wherein the first data has a first time duration;
receiving a request for the second data at a second time, wherein the second data has a second time duration, and wherein the second time duration has an associated end time;
determining a buffer length based upon one or more of the first time duration and the second time duration;
determining a first playback window associated with a first user device based on the determined buffer length, wherein a boundary for the first playback window is determined by subtracting the determined buffer length from the end time associated with the second time duration;
determining a second playback window associated with a second user device; determining an offset between the first playback window and the second playback window; and
synchronizing first content for display at the first user device with second content for display at the second user device based upon the determined offset.

16. The system of claim 15, wherein determining a second playback window associated with a second user device comprises:
receiving a request for third data at a third time, wherein the third data has a third time duration;
receiving a request for fourth data at a fourth time, wherein the fourth data has a fourth time duration; and
determining a second buffer length of the second user device based upon one or more of the third time duration and the fourth time duration, wherein the second playback window is determined based on the determined second buffer length.

17. The system claim 15, wherein synchronizing first content for display at the first user device with second content for display at the second user device comprises generating of buffering event.

18. The system of claim 15, wherein synchronizing first content for display at the first user device with second content for display at the second user device comprises encoding at least a portion of one or more of the first content and the second content with a modified playback speed.

19. The system claim 15, wherein synchronizing first content for display at the first user device with second content for display at the second user device comprises one or more of adding or removing content frames from one or more of the first content and the second content.

20. The system of claim 17 wherein the buffering event comprises an artificial buffering event.

* * * * *